United States Patent [19]
Furey et al.

[11] Patent Number: 5,651,648
[45] Date of Patent: *Jul. 29, 1997

[54] METHOD FOR REDUCING CERAMIC TOOL WEAR AND FRICTION IN MACHINING/CUTTING APPLICATIONS

[75] Inventors: Michael J. Furey, Blacksburg, Va.; Czeslaw Kajdas, Plock, Poland

[73] Assignee: Virginia Tech Intellectual Properties, Inc., Blacksburg, Va.

[*] Notice: The term of this patent shall not extend beyond the expiration date of Pat. No. 5,407,601.

[21] Appl. No.: 604,883

[22] Filed: Feb. 22, 1996

[51] Int. Cl.⁶ .................................................. B23C 5/28
[52] U.S. Cl. ........................... 409/131; 409/135; 409/136; 508/110
[58] Field of Search ........................ 508/500, 510, 508/516; 82/1.11, 900; 409/135, 136; 29/DIG. 87, DIG. 88, DIG. 89, DIG. 90, DIG. 71, DIG. 72, DIG. 26

[56] References Cited

U.S. PATENT DOCUMENTS

| | | | |
|---|---|---|---|
| 4,462,920 | 7/1984 | Snyder, Jr. et al. | 252/75 |
| 4,469,611 | 9/1984 | Synder, Jr. et al. | 252/75 |
| 4,826,612 | 5/1989 | Habeeb et al. | 252/32.7 E |
| 5,407,601 | 4/1995 | Furey et al. | 508/110 |

OTHER PUBLICATIONS

Furey, "Tribology", Encyclopedia of Materials Science & Engineering, Pergamon Press, Oxford, pp. 5145–5157, 1986.

Furey et al., "Models of Tribopolymerization as an Anti-Wear Mechanism", Proc. Jpn. Int. Tribology Conf., Nagoya, Japan 1990, pp. 1089–1094.

Furey et al., "Thermal and Catalytic Effects on Tribopolymerization as a New Boundary Lubrication Mechanism", Wear, vol. 136 (1990), pp. 85–97.

*Primary Examiner*—Daniel W. Howell
*Assistant Examiner*—Christopher Kirkman
*Attorney, Agent, or Firm*—Whitham, Curtis, Whitham & McGinn

[57] ABSTRACT

A method for reducing wear of ceramic cutting components during machining operations in which surface material is removed from a workpiece with reduced friction and with improved surface finish imparted to the reshaped workpiece. The method uses of cutting fluid compositions containing monomers capable of forming polymers in situ when subjected to tribological conditions (such as high temperature, pressure, and friction) existing at the contact area developed between the ceramic tool and surface of the workpiece during machining.

26 Claims, 1 Drawing Sheet

METHOD FOR REDUCING CERAMIC TOOL WEAR AND FRICTION IN MACHINING/CUTTING APPLICATIONS

BACKGROUND OF THE INVENTION

1. Field of the Invention

The invention is generally directed to a method using tribopolymerization for reduction of tool wear and friction between a ceramic cutting tool and a workpiece in machining/cutting applications while improving the surface finish imparted to the reshaped workpiece.

2. Description of the Prior Art

A typical metal machining operation involves creating a new shape in a workpiece by removing surface material from the workpiece in a controlled manner. The creation of such new shapes by removal of stock material from the workpiece generates high friction and high temperature, which conditions can cause and aggravate tool wear. The sources of heat mainly emanate from the shear zone and tool-chip interface zone. The highest temperature zone typically is at the tool-chip interface zone (friction zone) where crater wear of the cutting tool occurs.

Therefore, metal cutting lubricants have been used in the past in efforts to mitigate the effects of frictional forces and heat stresses to which a machining tool is subjected. Such cutting fluids have been used for various objectives, including: cooling and controlling the tool and workpiece temperature to minimize distortions and/or tool wear; lubricating and reducing friction between the tool and workpiece (and removed surface chip) to reduce tool wear; and facilitating swarf removal to improve surface finish and/or reduce tool wear. The type of workpiece, e.g., its hardness, the nature of the machining operation to be performed, and severity of the operation, will influence the choice of cutting fluid employed.

Conventional cutting fluids for machining operations on nonferrous (softer) workpieces include, for example, general-purpose or clear-type, fatty soluble oils. For machining low-carbon and medium-carbon steels, or in machining operations such as grinding, turning, milling and drilling operations on high hardness workpieces (e.g., high-carbon and alloy steels and stainless and heat-resistant alloys), extreme-pressure soluble oils (e.g., containing sulfurized or chlorinated extreme-pressure additives) or synthetic chemical cutting fluids (e.g., containing rust inhibitors) have been used.

So-called neat cutting fluids have been required in high hardness workpieces for gear shaping, hobbing, broaching, tapping, and some drilling operations. Such neat cutting fluids include, for example, a very low viscosity, inactive oil containing fatty and chlorinated additives; an inactive oil containing sulfurized fatty extreme-pressure additive; a multipurpose, chlorinated extreme-pressure oil with anti-stick-slip additives; an active oil containing free sulfur and sulfurized fat; an inactive, extreme-pressure oil containing chlorinated and fatty additives; a low-viscosity, active oil containing free sulfur and sulfurized fatty additives; and a special-purpose, highly-chlorinated, active extreme-pressure oil.

While the above-mentioned types of cutting fluids may be effective for conventional machining operations, the machining industry constantly seeks to improve productivity and reduce costs by increasing cutting speed in machining, among other things. These more vigorous machining operations desired place new and greater demands on the cutting fluid. For example, high speed machining (HSM) involves increasing peripheral cutting speeds significantly higher than those currently used in most machine shops. For instance, the maximum peripheral cutting speeds associated with current high speed machining operations range from less than 2.54 m/s (500 surface feet per minute) for titanium alloys, to about 5.08 m/s (1000 sfpm) for nickel-based alloys.

Therefore, under the conventional wisdom, one might surmise that these more severe machining operations associated with high speed machining would tend to demand more active cutting fluids. This might suggest that cutting fluids with additives, particularly extreme pressure ones, would be required for such severe operating conditions. However, as it turns out, prior high speed machining with ceramic tools has been carried out under dry conditions because the use of conventional liquid lubricants, such as mineral-oil based and water-based lubricants, increase thermal-mechanical shock and/or corrosion. Such thermal-mechanical shock causes fracture and chipping of the ceramic tool. However, the ability to dry cut a metal workpiece with no lubricating fluid is very limited, an example being the machining of cast iron or super-alloys such as Inconel 718 with cubic boron nitride (CBN) compacts.

U.S. Pat. No. 5,407,601 (Furey et al.) discloses certain fluid compositions comprised of a monomer constituent dissolved in a carrier fluid, where the monomer constituent is capable of forming a polymer film directly on rubbing ceramic surfaces but is not polymerized in solution. The fluid composition is effective for reducing wear in the rubbing ceramic surfaces. U.S. Pat. No. 5,407,601 patent relates to using the fluid composition as a lubricant for rubbing surfaces, and it seeks to reduce wear of material from either of the rubbed surfaces.

The present inventors have found a mode of reducing tool wear and friction in machining operations which significantly increases ceramic tool life and improves surface finish of the workpiece with minimal environmental impact and problems, and without causing thermal-mechanical shock in the friction area, or corrosion of a metal workpiece.

SUMMARY OF THE INVENTION

It is an object of this invention to provide a novel method for reducing wear of ceramic cutting components during machining operations in which surface material is removed from a workpiece with reduced tool wear and friction while improving the surface finish imparted to the reshaped workpiece.

It is also an object of the invention to increase material removal from the workpiece during machining operations.

It is a further object of the invention to employ a cutting fluid in small quantities to reduce the risk of thermal shock to a ceramic tool surface.

It is yet another object of the invention to minimize environmental concerns associated with the machining operations by effectively reducing the quantity of cutting fluid needed to conduct machining.

According to the invention, there is a method of reducing wear of a ceramic cutting tool itself and reducing friction between the cutting tool and a workpiece, such as a metal or ceramic workpiece, by use of cutting fluid compositions containing monomers capable of forming polymers in situ when subjected to tribological conditions (such as high temperature, pressure, and friction) existing at the contact area developed between the ceramic tool and surface of the workpiece during machining.

For purposes of this invention, the machining operations contemplated involve removal of stock material from a workpiece, such as a metal or ceramic workpiece, at its surface with a ceramic cutting tool such that fresh workpiece surfaces are continuously being generated during the machining operation. Thus, as can be understood, the interaction of the contacting surfaces (i.e., tool and workpiece surface) associated with a machining environment is dynamic and complex, and it is fundamentally unlike an environment involving modes of lubricating rubbing surfaces wherein the objective is to avoid, not achieve, loss of surface material.

Yet, the present inventors have surprisingly discovered that protective polymeric films can be formed in situ from certain monomers at the contacting area of the tool and workpiece surface at a rate and in a manner that can adequately keep pace with the dynamic set of conditions associated with a machining operation so as to reduce tool wear, reduce tool/workpiece friction during machining, and/or improve the surface finish of the cut workpiece.

The polymer films formed "in situ" during machining in the present invention are quite thin and do not form in the bulk carrier fluid nor do they form in non-contacting regions of the ceramic cutting tool and workpiece. Rather, the polymer films only form where they are most needed, i.e., the cutting tool and/or workpiece surface areas in contact with each other during machining, and the polymer films formed are continuously and simultaneously worn away and then reformed under the tribological conditions. "Tribopolymerization" is a term used herein meaning the planned or intentional formation of protective polymeric films directly and continuously on rubbing surfaces to reduce damage and wear by the use of minor concentrations of selected monomers capable of forming polymer films in situ. Such "in situ" polymerization of monomer compounds to form a polymer film may be initiated by high temperatures, exo-electron emission, and high pressures.

In general, the monomeric compounds used in the cutting fluid composition that are amenable to in situ polymerization under the tribological conditions encountered in this invention include certain ethylenically unsaturated monomers that form polymers by addition type reactions, and certain monomers capable of polymerizing via condensation reaction, and both described herein.

For example, in one preferred embodiment, the monomer compound is an ethylenically unsaturated compound that forms polymers by an addition type reaction and having a structure of general formula (I):

$$CH_2=C(R_1)R_2 \qquad (I)$$

wherein $R_1$ is selected from H and $CH_3$, and $R_2$ is an organic radical comprising 1 to 24 carbon atom with the proviso that $R_2$ optionally may contain at least one oxygen atom or nitrogen atom, or both.

The monomers employed in the inventive method can be used alone in pure form as applied to the workpiece surface and/or ceramic tool surface expected to be brought into contact during machining. Alternatively, the monomers can be dissolved, partially dissolved, or dispersed as additives within a carrier fluid. The dissolution or dispersion of the monomer in a liquid carrier can be advantageous from the standpoint of cost, handling, and potential hazards in use. Where the cutting fluid composition involves a dissolution or dispersion of the monomer compound in a carrier fluid, the cutting fluid composition generally contains 0.01% to 10% by weight of the monomer compound, and 90.0% to 99.9% by weight of a carrier fluid. The carrier fluid can be selected from mineral oils, hydrocarbons, synthetic oils, and other compounds that disperse the monomer and do not react chemically with the monomer in the bulk fluid. Examples of such carrier fluids include hexadecane, polyethylene glycol, aqueous polyethylene glycol, and water. The carrier fluid is used in relatively small quantities to avoid thermal shock of ceramic tools.

As yet another mode of delivery, the monomer compound can be used as a supplemental additive introduced to a cutting fluid containing other adjuvants such as dyes, metal deactivators, corrosion inhibitors, emulsifiers, solubilizers, and so forth.

According to one embodiment of the invention, there is a method for reducing wear of a ceramic cutting tool and friction between the ceramic cutting tool and a workpiece during machining, including the steps of:

(a) providing a ceramic cutting tool having a ceramic surface and a workpiece having a workpiece surface;

(b) contacting the ceramic surface of the ceramic cutting tool with the workpiece surface;

(c) moving the workpiece surface and the ceramic surface relative to each other in a manner effective for causing the cutting tool to remove surface material from the workpiece; and (d) applying a cutting fluid composition to at least one of the workpiece surface or the ceramic surface at a time before, during, or both before and during, the removal of the surface material from the workpiece, the cutting fluid composition containing a monomer compound capable of in situ polymerization during the removal of the surface material from the workpiece, whereby the cutting fluid composition reduces wear of the ceramic surface and friction between the cutting tool and the workpiece.

This invention has wide applicability in preventing wear in ceramic tool materials during machining operations. Ceramic materials that can be protected against wear by the inventive method include, for example, alumina, tungsten carbide, silicon nitride, titanium carbide, and combinations thereof, such as a sintered combination of alumina and titanium carbide.

The cutting fluid composition containing the monomers can be applied to the surface of the ceramic tool or the surface of the workpiece, or both, prior to and/or during contact between the tool and workpiece. From a practical standpoint, it often is more convenient to apply the cutting fluid composition to the surface of the workpiece shortly before it is brought into contact with the tool. The cutting fluid composition can be effectively delivered to the cutting zone in many convenient diverse ways, including, for example:

(a) injecting the compound to a nylon or (other suitably bristled material) flow gun brush by using a variable flow syringe pump;

(b) injecting the compound directly into the machining contact zone;

(c) introducing the compound as an air-carried mist;

(d) vapor phase delivery of the monomer as dispersed in a carrier gas (e.g., air, $N_2$) under sealed conditions or through a small nozzle in the tool holder; and (e) any other suitable kind of manual or automatic application.

One embodiment of the invention involves pre-coating a workpiece first with a solution (e.g., water, alcohol or other volatile hydrocarbon solvent) containing a monomer compound as described herein to pre-deposit a very thin film of the monomer compound on the workpiece, wherein the monomer compound can polymerize directly on the surface of the workpiece as cutting proceeds. This treatment minimizes the complexity of feeding even small amounts of cutting fluid continuously.

For purposes of this application, "machining" generally means to reshape a portion of a workpiece by machinery. Shaping includes cutting type operations where material is physically separated from and removed from the workpiece by force of an edged instrument. Machining operations within the scope of the invention include, for example, lathing, broaching, tapping, threading, gear shaping, reaming, drilling, milling, hobbing, grinding, turning operations, and the like.

An important advantage of this invention is that it provides dramatic tool tip (flank) wear reduction, significant tool crater wear reduction, and friction reduction, in machining operations involving ceramic tools. For instance, the data summarized herein shows that the use of 1% methyl 2-acrylamido-2-methoxyacetate (MAMA) as monomer as dispersed in a fluid carrier has been observed by the investigators to reduce friction during machining by 30% and ceramic tip wear by over 60%, while producing an excellent surface finish. Use of a cutting fluid composition of pure diallyl phthalate has been observed to reduce friction by 40% and reduce ceramic tip wear by 85%.

The reductions in friction achieved by the invention can translate into significant savings in energy costs. The reductions in tool wear achieved reduce the replacement costs for cutting tools as tool life is prolonged, and resulting in diminished maintenance demands and cost associated with resetting up the machinery. Additionally, increased production is possible as less down time is encountered with the machinery. Also, the invention provides reduced incidence of workpieces with unacceptable surface finish.

Further, the novel method for machine tool wear reduction and friction reduction between the tool and workpiece according to this invention does not cause any temperature shock with respect to the friction contact area, especially where the brush-pump coating system is employed which evenly distributes cutting liquids according to the invention to effectively allow the boundary "lubrication" process to take place. Consequently, this lubrication does not negatively impact the surface finish of a metal workpiece (e.g., by abrasion corrosion effects). It is to be borne in mind that terminology such as "lubrication" or "lubricant" may be used herein occasionally merely for sake of convenience in reference to the application of the cutting fluid according to the invention. Any lubricative effect is subsumed to the overall reduction of friction provided by the present invention, and many advantageous effects as described herein are realized by this invention which are relevant to the machining environment where removal of surface material from a workpiece is the objective.

Another advantage of the inventive method is that it requires no special or customized equipment to be practiced. Also, the inventive method ensures a continuous generation of protective surface reaction/polymeric films to reduce both wear of the machining tool and friction of the machining process. Also, the method of the present invention is applicable for ceramic tool materials for high speed machining (HSM), such as alumina, combinations of alumina and titanium carbide, cemented tungsten carbide, and silicon nitride.

Another advantage of the invention is that the inventive approach can employ the cutting fluid composition as a relatively thin film in the cutting zone which does not depend on cooling and use of large (gross) quantities of fluid. This affords a minimalist approach to reducing tool wear and friction. Consequently, the risk of thermal shock to a ceramic tool surface otherwise posed if it were flooded with a coolant fluid is avoided by the present invention. Further, the present invention is more environmentally friendly. That is, since the present invention uses the cutting fluid in relatively thin film form as a surface-chemical and not in flooding quantities, a significant reduction in special disposal, treatment, and handling requirements, is realized.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
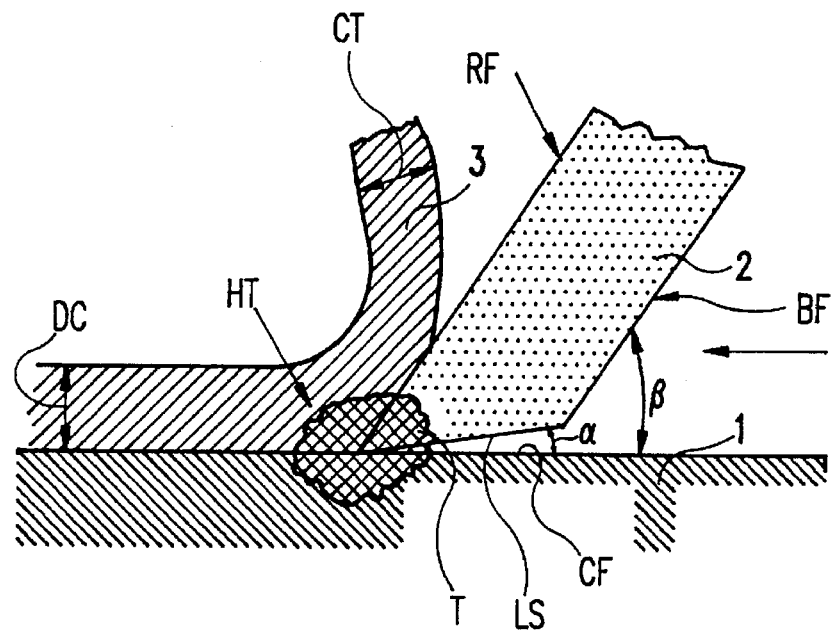
FIG. 1 is a cross-sectional view of a general machining operation where a ceramic tool cuts a metal surface.

Referring now to the drawings, and more particularly to FIG. 1, there is shown a representation of a machine tool cutting operation, and particularly a lathing operation. A metal workpiece 1 is rotated relative to ceramic cutting tool 2 such that the cutting tool 2, which is fixed in position, shears off a strip of material from the surface of the metal workpiece 1. The metal material removed through a depth DC from the surface of the metal 1 by the cutting action of tool 2 shears away as chip 3 having a chip thickness CT, leaving a corresponding "furrow" in the surface of the metal. The pointed tip T of the tool 2 provides the cutting edge and it is inclined at clearance angle α defined by the gap formed between the lower surface LS of the tip T and the cleared (exposed) surface CF of the cut metal 1. The angle β indicates an end cutting angle defined between the back face BF of tool 2 and cleared face CF. The leading face of the tool 2 is referred to as the rake face RF. The area of highest temperature HT during cutting is generated in the immediate vicinity of where tip T contacts the surface of the metal workpiece 1.

In this invention, the cutting fluid compositions to be used contain monomers selected from among two basic categories of monomers, including (1) ethylenically unsaturated monomers that form polymers by addition type reactions, and (2) monomers that form polymers by condensation type reactions.

Useful ethylenically unsaturated monomers that form polymers by addition type reactions include compounds of the following general formula (I):

$$CH_2=C(R_1)R_2 \qquad (I)$$

where $R_1$ may be H or $CH_3$, while $R_2$ is an organic alkyl or aryl radical containing from 1 to 24 carbon atoms with the proviso that $R_2$ optionally may contain oxygen and/or nitrogen atoms.

Categories of compounds within the scope of formula (I) include, for example:

(a) 1-alkenes
(b) methacrylates;

(c) acrylates;

(d) vinyl esters;

(e) vinyl alkyl ethers;

(f) allyl esters of alkyl and aryl acids;

(g) divinyl and diallyl analogs of the above compounds;

(h) trivinyl and triallyl analogs of the above compounds; and (i) compounds in which $R_2$ contains no oxygen or nitrogen atoms.

More specific classes of the aforesaid compound of formula (I) used in or as the cutting fluid composition employed in the inventive method include 1-alkenes, alkyl acrylates, alkyl methacrylates, vinyl esters, vinyl alkyl ethers, allyl esters of alkyl monofunctional acids, allyl esters of aryl monofunctional acids, divinyl esters of alkyl difunctional acids, diallyl esters of alkyl difunctional acids, divinyl esters of aryl difunctional acids, diallyl esters of aryl difunctional acids, trivinyl esters of alkyl trifunctional acids, triallyl esters of alkyl trifunctional acids, trivinyl esters of aryl trifunctional acids, and triallyl esters of aryl trifunctional acids.

Specific examples of aforesaid compound of formula (I) used in or as the cutting fluid composition employed in the inventive method include 1-dodecene, 1-tetradecene, 1-hexadecene, 1-octadecene, 1-eicosene, styrene, 4-methyl styrene, 4-vinylbiphenyl, 2-vinylnaphthalene, 9-vinylanthracene, n-butyl methacrylate, lauryl methacrylate, hexyl methacrylate, n-octadecyl methacrylate, iso-decyl acrylate, vinyl acetate, vinyl propionate, vinyl octoate, vinyl hexyl ether, vinyl 2-ethylhexanoate, vinyl stearate, vinyl octadecyl ether, acrylamide, vinyl cyclooctane, vinyl ferrocene, diallyl sebacate, diallyl orthophthalate, diallyl iso-phthalate, diallyl succinate, trans β-methylstyrene, cis-11-hexadecane -1-yl-acetate, cis-11-hexadecane-1-ol, oleyl alcohol, 1,1-diphenyl-ethylene, α-methylstyrene, methacrylamide, triallyl trimesate, and methyl-2-acrylamido-2-methoxyacetate.

As one specific example, the compound of formula (I) used in or as the cutting fluid composition in the inventive method is diallyl (ortho)phthalate, and, more preferably in this embodiment, the cutting fluid composition is entirely (pure) diallyl phthalate or at least substantially pure diallyl phthalate. Allyl monomers, such as diallyl phthalate, are well-suited for use as the sole constituent of the cutting fluid composition used in this invention. Allyl monomers can be manufactured by a known reaction of a monofunctional unsaturated alcohol, viz. an allyl alcohol, with a difunctional acid. Ester linkages are thus formed and the resulting molecules are monomeric.

As monomers useful in the inventive method that are capable of polymerizing via condensation reaction, those compounds include (a) hydroxy acids of the general formula HO—R—COOH; (b) methyl esters of hydroxy acids of the general formula HO—R—COOCH$_3$, (c) amino acids of the general formula H$_2$N—R—COOH, (d) methyl esters of amino acids of the general formula H$_2$N—R—COOCH$_3$, (e) mixtures of glycols and dibasic acids or their methyl esters according to the general formulae HO—R—OH plus either HOOC—R'—COOH or CH$_3$OOC—R'—COOCH$_3$, (f) mixtures diamines and dibasic acids or their methyl esters according to the general formulae H$_2$N—R—NH$_2$ plus either HOOC—R'—COOH or CH$_3$OOC—R'—COOCH$_3$, and (g) any of the above compounds in which polyols are used in place of glycols and polyacids in place of diacids, where above groups R and R' represent an alkyl group having 1 to 38 carbon atoms.

An example of a useful cutting fluid composition of the invention using a monomer that forms a polymer by polycondensation reaction involves 0.01% to 10% by weight of 11-amino undecanoic acid or a $C_{36}$ dimer acid/ethylene glycol monoester, and 90.0% to 99.9% by weight of a carrier fluid selected from mineral oils, hydrocarbons, synthetic oils, and hexadecane. The $C_{36}$ dimer acid/ethylene glycol monoester can be prepared in the manner disclosed in U.S. Pat. No. 3,180,832 (Furey et al.) and U.S. Pat. No. 3,429,817 (Furey et al.), which are incorporated herein by reference.

Ceramic tools applicable to this invention relate to higher wear resistant cutting tools. Usually they are made from sintered alumina and various other ceramic powders. The most recent developments are ceramic-ceramic composites, which include an alumina matrix reinforced by tiny silicon carbide and alumina-titanium carbide. The cutting tools having 30% TiC content and the finest TiC grain size showed superior resistance to tracking optimum cutting performance in turning alloyed steel. Alumina/titanium carbide (Al$_2$O$_3$+ TiC) inserts are useful as cutting tools in the inventive method. Al$_2$O$_3$/TiC ceramic tools exhibit higher hardness and toughness compared to pure alumina ceramic tools, and offer advantages with respect to wear and fracture behavior in cutting performance.

The metals that can be machined with reduced friction by a ceramic tool in the inventive method include, for example, steel, steel alloys, iron, aluminum, brass, copper, nickel, nickel alloys, and so forth. The ceramic materials that can be machined with reduced friction by a ceramic tool in the inventive method include, for example, alumina, zirconia, silicon carbide, silicon nitride, and boron nitride.

There are several essential cutting parameters to keep in mind when machining with ceramic cutting tools. The feed rate, if used incorrectly, has a damaging effect on the tool in the form of surface fracture. If using a high feed rate while machining, a brittle ceramic tool insert suffers from deformation and fracture wear. Also when machining, a negative rake angle is needed, because positive rake angles chip the tool's cutting edge when it contacts with the surface. It is important to note that with various machining parameters, such as surface speed, feed rate, cutting depth, and rake angle, consistency is a must. Changing one parameter can make a tremendous difference in tool wear. One of ordinary skill in the art will readily appreciate and understand the effects and interplay of these above-discussed parameters and how to manage these for a desired effect.

In the following examples, objects and advantages of this invention are further illustrated by various embodiments thereof but the details of those examples should not be construed to unduly limit this invention. All parts and percentages of the compositions described therein are by weight unless otherwise indicated.

EXAMPLES

Experimental Procedure:

The tests involved a constant turning of an alloy steel workpiece using a 10 horsepower (7.46 kW) Mazark lathe. The workpiece was a 8 inch (20.3 cm) diameter, solid cylinder made of AISI 4340 alloy steel having a tensile strength of 178,000 psi (123,000N/cm$^2$) and a Brinell Hardness of 363. The Mazark lathe (Model #MK46X15006) was equipped with a computerized data acquisition unit which recorded feed force (X force), cutting force (Y force), and radial force (Z force) from a piezoelectric strain gage/dynamometer as well as temperature from a thermocouple. A thermocouple was placed directly under the tip of a ceramic tool insert to measure the approximate cutting temperature near the tip of the tool, and the strain gage/ dynamometer was integrated into the toolholder unit for measuring cutting forces. The ceramic tool used was a vitrified alumina-titanium carbide insert (70% $Al_2O_3$+30% TiC) having a hardness (Hv) of 2000 and a transverse rupture strength of 125,000 psi (86,000N/cm$^2$). The tool was made by Kennametal, under the product designation no. TNG332. The ceramic tool had an equilateral triangle shape with a thickness of 3/16 inch (0.48 cm), a nose radius of 1/32 inch (0.08 cm), and an inscribed circle of 3/8 inch (0.95 cm) diameter. The ceramic tool holder used was made by Kennametal, and had the product designation CTGNR-123. The tool holder for the ceramic tool had a rake angle −5°, a clearance angle of −5°, a side cutting edge 0°, and an end cutting angle of 60°. The workpiece was rotated at a surface speed of 1050 surface feet per minute (320 surface meters per minute), a feed rate of 0.006 inches (0.015 cm) per revolution, with a depth of cut in the workpiece provided of 0.025 inches (0.064 cm). The environment of the cut was either dry (non-lubricated) or wet (lubricated), as indicated in the examples, in ambient atmosphere.

The firction and wear reduction process, where used as indicated in the examples, involved a wet-brush system. Two 50 cc syringes pumped lubricant fluid to a nylon flow gun brush by using a variable flow syringe pump. The brush was placed on the surface of the workpiece and held in place by an adjustable pipe holder at a position of about 2.0 cm preceding the point of contact of the ceramic tool. This wear and friction reduction system allowed cutting fluid to be distributed evenly on the surface of a workpiece in the direction of cut.

Figure 2:
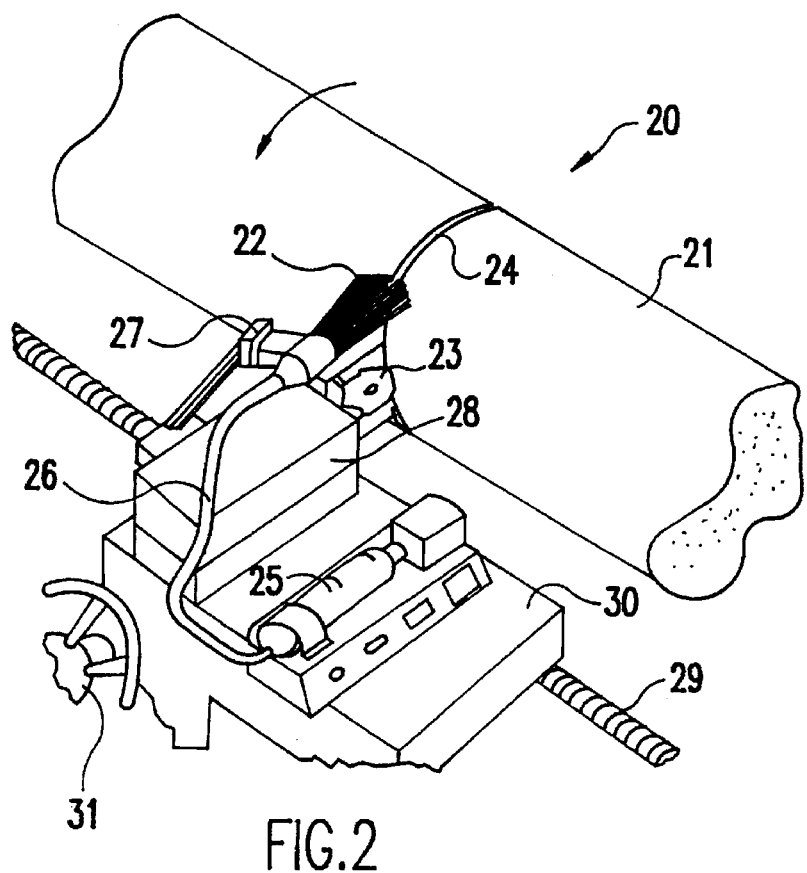
FIG. 2 is a perspective view of a lathe/fluid delivery system including means to provide a cutting lubricant to the cutting zone according to a method of the invention.

FIG. 2 shows a representative diagram of the machining system 20 used for performing these cut tests. The alloy steel workpiece 21 was gripped at its lateral ends to enable it to be driven in rotation by the lathe motor (not shown). Nylon gun brush 22 was positioned in place by pipe holder 27 and the brush 22 was placed in contact with the peripheral surface of workpiece 21 along a circumferential line ahead of the point of contact made by ceramic tool 23. A variable syringe pump 25 pumped lubricant fluid to brush 22 via tubing 26 from two 50 cc syringes (not shown). The lubricant was pumped to brush 22 at a rate of 5.0 cc/minute (0.083 cc/second). The tool 23 was held by the toolholder unit 28 and cut groove 24 in the circumferential surface of the workpiece 21. The brush 22 and ceramic tool 23, and associated equipment, were supported on support frame 30 where frame 30 could be translated laterally relative to the workpiece 21 along track 29 via wheel 31 to allow the operator to set the location of the circumferential groove 24.

To evaluate each ceramic tool side, a process of labeling was developed in order to analyze tool wear correctly. In particular, an L-type shape was etched into the face of each triangular shaped ceramic tool insert and each side labeled in reference to that shape. Six tests were performed on a fresh ceramic tool insert for each tested lubricant and the cut workpiece chips were collected after each test. Each machining test lasted approximately 8 minutes. The coefficient of friction, tool crater wear, and tool tip wear, were measured for each of the six tests for a given lubricant, and their arithmetic average calculated. The lubricant feed rate, workpiece surface speed (measured by tachometer), and cutting depth were maintained constant throughout each test and were kept at the same respective values for all the tests run on the various cutting fluid compositions so that the only changed variable was the type of cutting fluid used.

A Talyform traveling stylus device, manufactured by Rank Taylor Hobson, was used to measure crater wear and cutting edge wear. As mentioned above, a piezoelectric dynamometer built into the toolholder measured cutting forces and a thermocouple placed under the cutting edge measured cutting temperatures. The information was recorded into a data file.

Data were developed on the anti-wear, anti-friction and temperature effects of various cutting fluid compositions.

The following cutting fluid compositions were separately tested (a) water; (b) 100% hexadecane; (c) 1% diallyl (ortho)phthalate +99% hexadecane; (d) 100% diallyl phthalate; (e) 1% methyl 2-acrylamido-2-methoxy-acetate +99% hexadecane; and (f) 1% methyl 2-acrylamido- 2-methoxy-acetate +99% water. Also, a run in which no cutting fluid was used also was performed.

The tested cutting fluid compositions were compared with the test results obtained under dry cutting conditions (no liquid lubricant used).

The data collected on coefficient of friction (μ), in terms of average values thereof, are presented in Table 1.

TABLE 1

| Cutting Fluid | Coefficient of Friction (μ) |
| --- | --- |
| Water | 0.53 |
| Hexadecane | 0.36 |
| Diallyl phthalate (1%) in Hexadecane | 0.39 |
| Diallyl phthalate (100%) | 0.25 |
| Methyl 2-acrylamido- 2-methoxy-acetate (1%) in Hexadecane | 0.29 |
| Methyl 2-acrylamido- 2-methoxy-acetate (1%) in water | 0.42 |
| None (dry) | 0.42 |

As can be calculated from the data in Table 1, under the same cutting conditions and as compared to the dry cutting condition tests: hexadecane reduced friction by 14%, 1% methyl 2-acrylamido -2-methoxy-acetate in hexadecane by 31%, 1% diallyl phthalate in hexadecane by 10%, and pure diallyl phthalate by 40%. However, water, as used alone, actually increased the coefficient of friction.

Table 2 summarizes the crater wear results obtained.

TABLE 2

| Cutting Fluid | Ave. Tool Crater Wear (μm) | % Reduction Over Dry Cutting |
| --- | --- | --- |
| None (dry) | 11.0 | — |
| Water | 10.5 | 4.5 |
| Hexadecane | 9.2 | 16.4 |
| Diallyl phthalate (1%) in hexadecane | 9.8 | 10.9 |
| Diallyl phthalate (100%) | 7.0 | 36.4 |
| Methyl 2-acrylamido- 2-methoxy-acetate (1%) in Hexadecane | 7.7 | 30.0 |
| Methyl 2-acrylamido- 2-methoxy-acetate (1%) in water | 9.8 | 10.9 |

It is noted that pure diallyl phthalate, which reduced the friction coefficient by 40%, also reduced the crater wear by about 36%. The 1% methyl 2-acrylamido-2-methoxy-acetate in hexadecane reduced crater wear by 30%.

Table 3 summarizes the tip wear results acquired.

TABLE 3

| Cutting Fluid | Ave. Tool Tip Wear (μm) | % Reduction Over Dry Cutting |
|---|---|---|
| None (dry) | 3.9 | — |
| Water | 1.0 | 74 |
| Hexadecane | 3.0 | 23 |
| Diallyl phthalate (1%) in hexadecane | 2.7 | 31 |
| Diallyl phthalate (100%) | 0.6 | 85 |
| Methyl 2-acrylamido 2-methoxy-acetate (1%) in Hexadecane | 1.5 | 62 |
| Methyl 2-acrylamido-2-methoxy-acetate (1%) in water | 4.8 | −23* |

*increase in tool tip wear relative to dry run

Significant reductions in tip wear occurred with pure diallyl phthalate. Crater and tip (flank) wear relative to the friction data were consistent.

The pure water-lubricated cutting test also provided good tip wear reduction, (i.e., over 70%). However, water under these friction conditions caused corrosion of the steel workpiece. That is, within the first few minutes after the test with pure water, the steel was visually observed as starting to corrode. Water containing 1% of the methyl 2-acrylamido-2-methoxy-acetate compound increased the tip wear by 20%. These results suggest that the water-based lubricants have serious limitations in HSM processes.

Surface finish is another consideration in using a cutting fluid. When using water, the surface of the alloy steel workpiece was noticeably more rough than when using hexadecane based fluids. There were no quantitative measurements of surface finish taken, but, by visual observation, the surface finishes could be distinctly rated as follows: Hexadecane-based (best)—dry (very good)—water-based (worst). The final metal surface finish was ranked by visual examination and comparison of the various examples using the following scoring system: 5=excellent; 4=very good; 3=good; 2=poor; and 1=very poor.

The effects of various tested cutting fluids on the friction, crater wear, tip wear, and workpiece surface finish, are summarized together in Table 4.

TABLE 4

| Cutting Fluid | Ave. Reduction vs. Dry Cutting, (%) | | | Metal Finish |
|---|---|---|---|---|
| | Friction | Crater Wear | Tip Wear | |
| None (dry) | — | — | — | 3 |
| water | −26† | 4 | 74 | 1 |
| HD[1] | 14 | 16 | 23 | 4 |
| DAP[2] (1%) in HD | 7 | 11 | 31 | 3 |
| DAP (100%) | 40 | 36 | 85 | 5 |
| MAMA[3] (1%) in HD | 31 | 30 | 62 | 4–5 |
| MAMA (1%) in H₂O | 0 | 11 | −23‡ | 2 |

†increase in friction relative to dry run
‡increase in tip wear relative to dry run
[1]Hexadecane
[2]Diallyl phthalate
[3]methyl 2-acrylamido-2-methoxy-acetate While the invention has been described in terms of its preferred embodiments, those skilled in the art will recognize that the invention can be practiced with modification within the spirit and scope of the appended claims.

We claim:

1. A method of reducing wear of a ceramic cutting tool and friction between the ceramic cutting tool and a workpiece during machining, comprising the steps of:
   (a) providing a ceramic cutting tool having a ceramic surface and a workpiece having a workpiece surface;
   (b) contacting said ceramic surface of said ceramic cutting tool with said workpiece surface;
   (c) moving at least one of said workpiece surface and said ceramic surface relative to each other in a manner effective for causing said cutting tool to remove surface material from said workpiece; and
   (d) applying a cutting fluid composition to at least one of said workpiece surface and said ceramic surface at a time before, during, or both before and during, said removal of said surface material form said workpiece, said cutting fluid composition containing a monomer compound whereby said cutting fluid composition reduces wear of said ceramic surface and friction between said cutting tool and said workpiece.

2. The method of claim 1, wherein said monomer compound is selected from the group consisting of monomers capable of polymerizing by addition reaction, and monomers capable of polymerizing by condensation reaction.

3. The method of claim 1, wherein said cutting fluid composition comprises 0.01% to 10% by weight of said monomer compound, and 90.0% to 99.9% by weight of a carrier fluid.

4. The method of claim 3, wherein said carrier fluid is selected from the group consisting of mineral oils, hydrocarbons, and synthetic oils.

5. The method of claim 1, wherein said cutting fluid composition consists essentially of said monomer compound.

6. The method of claim 1, wherein said ceramic surface is comprised of a material selected from the group consisting of alumina, tungsten carbide, silicon nitride, titanium carbide, and combinations thereof.

7. The method of claim 1, wherein said ceramic surface is comprised of a sintered combination of alumina and titanium carbide.

8. The method of claim 1, wherein said applying of said cutting fluid composition is accomplished by brushing said cutting fluid composition onto said workpiece surface.

9. The method of claim 1, wherein said applying of said cutting fluid composition is accomplished by directing a liquid stream of said cutting fluid composition onto said workpiece surface.

10. The method of claim 1, wherein said applying of said cutting fluid composition is accomplished by directing an air-carried mist of said cutting fluid composition onto said workpiece surface.

11. The method of claim 1, wherein said workpiece is a metal material.

12. The method of claim 1, wherein said workpiece is a ceramic material.

13. A method for reducing wear of a ceramic cutting tool and friction between the ceramic cutting tool and a workpiece during machining, comprising the steps of:
   (a) providing a ceramic cutting tool having a ceramic surface and a workpiece having a workpiece surface;
   (b) contacting said ceramic surface of said ceramic cutting tool with said workpiece surface;
   (c) moving at least one said workpiece surface or said ceramic surface relative to each other in a manner effective for causing said cutting tool to remove surface material from said workpiece; and (d) applying a cutting fluid composition to at least one of said workpiece surface and said ceramic surface at a time before, during, or both before and during, said removal of said surface material from said workpiece, said cutting fluid composition containing a compound having a structure of general formula (I):

$$CH_2=C(R_1)R_2 \qquad (I)$$

wherein $R_1$ is selected from H or $CH_3$, and $R_2$ is an organic radical comprising 1 to 24 carbon atom with the proviso $R_2$ optionally may contain at least one oxygen atom or nitrogen atom or both, said cutting fluid composition reducing wear of said ceramic surface and friction between said cutting tool and said workpiece.

14. The method of claim 13, wherein said compound of formula (I) is selected from the group consisting of alkyl acrylates, alkyl methacrylates, vinyl esters, vinyl alkyl ethers, allyl esters of alkyl monofunctional acids, allyl esters of aryl monofunctional acids, divinyl esters of alkyl difunctional acids, diallyl esters of alkyl difunctional acids, divinyl esters of aryl difunctional acids, diallyl esters of aryl difunctional acids, trivinyl esters of alkyl trifunctional acids, triallyl esters of alkyl trifunctional acids, trivinyl esters of aryl trifunctional acids, triallyl esters of aryl trifunctional acids, and alkenes.

15. The method of claim 13, wherein said cutting fluid composition consists essentially of diallyl phthalate.

16. The method of claim 13, wherein said compound of Formula (I) comprises methyl-2-acrylamido-2-methoxyacetate.

17. The method of claim 13, wherein said cutting fluid composition comprises 0.01% to 10% by weight of said compound of Formula (I), and 90.0% to 99.9% by weight of a carrier fluid.

18. The method of claim 17, wherein said carrier fluid is selected from other group consisting of mineral oils, hydrocarbons, and synthetic oils.

19. The method of claim 13, wherein said cutting fluid composition comprises 0.1% to 10% by weight of said compound of Formula (I), and 90.0% to 99.9% by weight of a carrier fluid.

20. The method of claim 13, wherein said ceramic surface is comprised of a material selected from the group consisting of alumina, tungsten carbide, silicon nitride, titanium carbide, and combinations thereof.

21. The method of claim 13, wherein said ceramic surface is comprised of a sintered combination of alumina and titanium carbide.

22. The method of claim 13, wherein said applying of said cutting fluid composition is accomplished by brushing said cutting fluid composition onto said workpiece surface.

23. The method of claim 13, wherein said applying of said cutting fluid composition is accomplished by directing a liquid stream of cutting fluid composition onto said workpiece surface.

24. The method of claim 13, wherein said applying of said cutting fluid composition is accomplished by directing an air-carried mist of said cutting fluid composition onto said workpiece surface.

25. The method of claim 13, wherein said workpiece is a metal material.

26. The method of claim 13, wherein said workpiece is a ceramic material.

* * * * *